US006975042B2

(12) United States Patent
Yamada et al.

(10) Patent No.: US 6,975,042 B2
(45) Date of Patent: Dec. 13, 2005

(54) ENGINE-DRIVEN GENERATOR

(75) Inventors: Yoshinori Yamada, Iwata (JP); Takahide Sugiyama, Iwata (JP); Takashi Fujita, Iwata (JP); Hitoshi Kashima, Iwata (JP); Naoto Mazuka, Iwata (JP); Hisamichi Naito, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 146 days.

(21) Appl. No.: 10/630,593

(22) Filed: Jul. 30, 2003

(65) Prior Publication Data
US 2004/0021320 A1    Feb. 5, 2004

(30) Foreign Application Priority Data

| Jul. 30, 2002 | (JP) | ............................. 2002-221756 |
| Jul. 30, 2002 | (JP) | ............................. 2002-221870 |

(51) Int. Cl.[7] .............................................. H02K 9/06
(52) U.S. Cl. ................ 290/1 R; 123/2; 322/1
(58) Field of Search ..................... 290/1 R; 123/2, 123/3; 322/1

(56) References Cited

U.S. PATENT DOCUMENTS

| 3,694,661 | A | * | 9/1972 | Minowa | ...................... 290/1 R |
| 4,134,370 | A | * | 1/1979 | Iwahashi et al. | ......... 123/41.31 |
| 4,438,733 | A | * | 3/1984 | Sasaki | ...................... 123/41.62 |
| 4,595,841 | A | | 6/1986 | Yaguchi | |
| 4,622,923 | A | * | 11/1986 | Nishimura et al. | ............. 123/2 |
| 4,647,835 | A | * | 3/1987 | Fujikawa et al. | ............... 322/1 |
| 4,836,123 | A | | 6/1989 | Grinde et al. | |
| 4,859,886 | A | * | 8/1989 | Tanaka et al. | ................. 310/51 |
| 5,694,889 | A | * | 12/1997 | Ball et al. | ................... 123/41.7 |
| 5,899,174 | A | * | 5/1999 | Anderson et al. | ............... 123/2 |
| 6,184,599 | B1 | | 2/2001 | Okabe et al. | |
| D477,569 | S | | 7/2003 | Iwatate et al. | |
| 6,758,169 | B2 | * | 7/2004 | Suzuki et al. | ................... 123/3 |
| 6,784,560 | B2 | * | 8/2004 | Sugimoto et al. | ........... 290/1 R |
| 6,792,897 | B2 | * | 9/2004 | Higuchi et al. | ................. 123/2 |

FOREIGN PATENT DOCUMENTS

| JP | 56-49699 | 5/1981 |
| JP | 57-00329 | 1/1982 |

(Continued)

*Primary Examiner*—Joseph Waks
(74) *Attorney, Agent, or Firm*—Knobbe, Martens, Olson & Bear LLP

(57) ABSTRACT

A power generator unit incorporates an engine and a generator driven by the engine. The generator incorporates a sound insulation cover that allows for efficient cooling of the various internal components. An engine crankcase cover mounts the generator close to the engine to promote a compact construction while allowing sufficient cooling of the engine, the generator, and a muffler. A fan draws in cooling air through one or more cooling air vents to cool a battery, an electronic control unit, the engine, the generator, and the muffler. The insulation cover provides quiet operation and efficient cooling of the power generator unit.

28 Claims, 14 Drawing Sheets

FOREIGN PATENT DOCUMENTS

| | | |
|---|---|---|
| JP | 58-204916 | 11/1983 |
| JP | 59-39933 | 3/1984 |
| JP | 59-74327 | 4/1984 |
| JP | 62-048915 | 3/1987 |
| JP | 62-48915 | 3/1987 |
| JP | 62-077035 | 4/1987 |
| JP | 01-178716 | 7/1989 |
| JP | 02-070924 | 3/1990 |
| JP | 10-196389 | 7/1998 |
| JP | 11-36879 | 2/1999 |
| JP | 11-36880 | 2/1999 |
| JP | 11-36881 | 2/1999 |
| JP | 2002-54453 | 2/2002 |

* cited by examiner

ENGINE-DRIVEN GENERATOR

RELATED APPLICATIONS

The present application is based on and claims priority under 35 U.S.C. §119 to Japanese Patent Applications Nos. 2002-221756 (filed on Jul. 30, 2002) and 2002-221870 (filed on Jul. 30, 2002), the disclosures of which are hereby incorporated by reference in their entirety.

BACKGROUND OF THE INVENTION

1. Field of the Invention

The present invention generally relates to a portable power supply. More particularly, the present invention relates to a portable power supply that incorporates a generator driven by an engine.

2. Description of the Related Art

Portable power supplies such as power generators that incorporate a generator driven by an engine are popular for various uses. Power generators are designed to be compact, convenient and useful. The components used in power generators can be designed and mounted in a compact manner to save space and promote portability; however, providing sufficient power to support user demands. Designing and incorporating compact components into the power generator environment can be challenging due to design necessities such as sufficient cooling of the engine and generator.

Portable power generator units are commonly used on construction sites located in areas of existing neighborhoods or business districts. In such environments of use, the level of noise produced by the power generator unit becomes a concern in order to lessen any disturbance that such construction may create on the surrounding neighbors and businesses. To address this concern, prior portable power generators have attempted to insulate the engine and generator so as to deaden the sounds produce by this machinery; however, such attempts have created complex housings and internal structures within the housings, and have not provided sufficient cooling and sound insulation.

SUMMARY OF THE INVENTION

An aspect of the present invention involves a power generator unit comprising a housing including at least two air inlet openings and at least one outlet opening. An engine is disposed at least partially within the housing and a muffler communicates with the engine through an exhaust conduit. A generator is driven by the engine and is disposed at least partially within the housing. A first fan is driven by the engine and is disposed on one side of the engine and a second fan is driven by the engine and is disposed on the other side of the engine. A battery is disposed within the housing immediately next to but spaced apart from one of the air inlet openings. An electronic control module communicates with at least one of the engine and generator so as to control at least one operational characteristic of the power generator unit. The electronic control module is positioned immediately next to, but spaced apart from the other air intake opening. Each intake opening communicates with an interior space within the housing in which air that flows through the one air inlet opening and over the battery merges with air that flows through the other air inlet opening and over the electronic control module. The first fan draws air from the interior space and communicates with a first air path that extends from the first fan, across at least portions of the exhaust conduit and the muffler, to the air outlet opening. The second fan draws air from the interior space and communicates with a second air path that passes across the generator and over at least a portion of the muffler before exiting the outlet opening.

Another aspect of the present invention involves a power generator unit comprising a cover having at least a first air intake opening, a second air intake opening, and a discharge opening. An engine includes a first body portion that defines, at least in part, a combustion chamber, a second body portion that defines, at least in part, a crankcase chamber and is disposed next to the first body portion, and at least one muffler receives exhaust gases from the combustion chamber. A generator is driven by the engine and is mounted inside a generator housing. The engine drives at least a first fan and a second fan. The first and second air intake openings are disposed on one side of the cover. The engine is disposed downstream of the first fan, and the discharge opening is disposed downstream of the engine. A first cooling air path occurs when the engine drives the first fan to draw external air through both air intake openings to cool at least the first body portion of the engine. The first cooling path then discharges the heated air through the discharge opening. The second air intake opening is disposed relative to the first and second fans. A portion of external air drawn through at least one of the air intake openings passes through air vents located in the generator housing, through the second fan so as to produce a second cooling air path. The second cooling air path then exits the cover through the discharge opening. The generator is disposed generally in the second cooling air path.

Some of the applications and configurations of the improved power generator unit will be discussed below in connection with a preferred embodiment of the invention. It should be noted that the following discussion relates to several distinct features of the present invention and not all of the features need to be present in any single embodiment of the present invention. Thus, some of the features may be used with other features in some applications while other applications will only reflect one of the features. Moreover, while the features, aspects and advantages can be applied to portable power generators in the narrow sense, they can also be applied to other power supplies as will become apparent to those of ordinary skill in the art.

BRIEF DESCRIPTION OF THE DRAWINGS

These and other features, aspects and advantages of the present invention are described in detail below in connection with the accompanying drawings. The drawings comprise 14 figures.

This figure also illustrates the cooling air paths from a top view; again, the cooling air paths are shown in solid bold lines.

Figure 1:
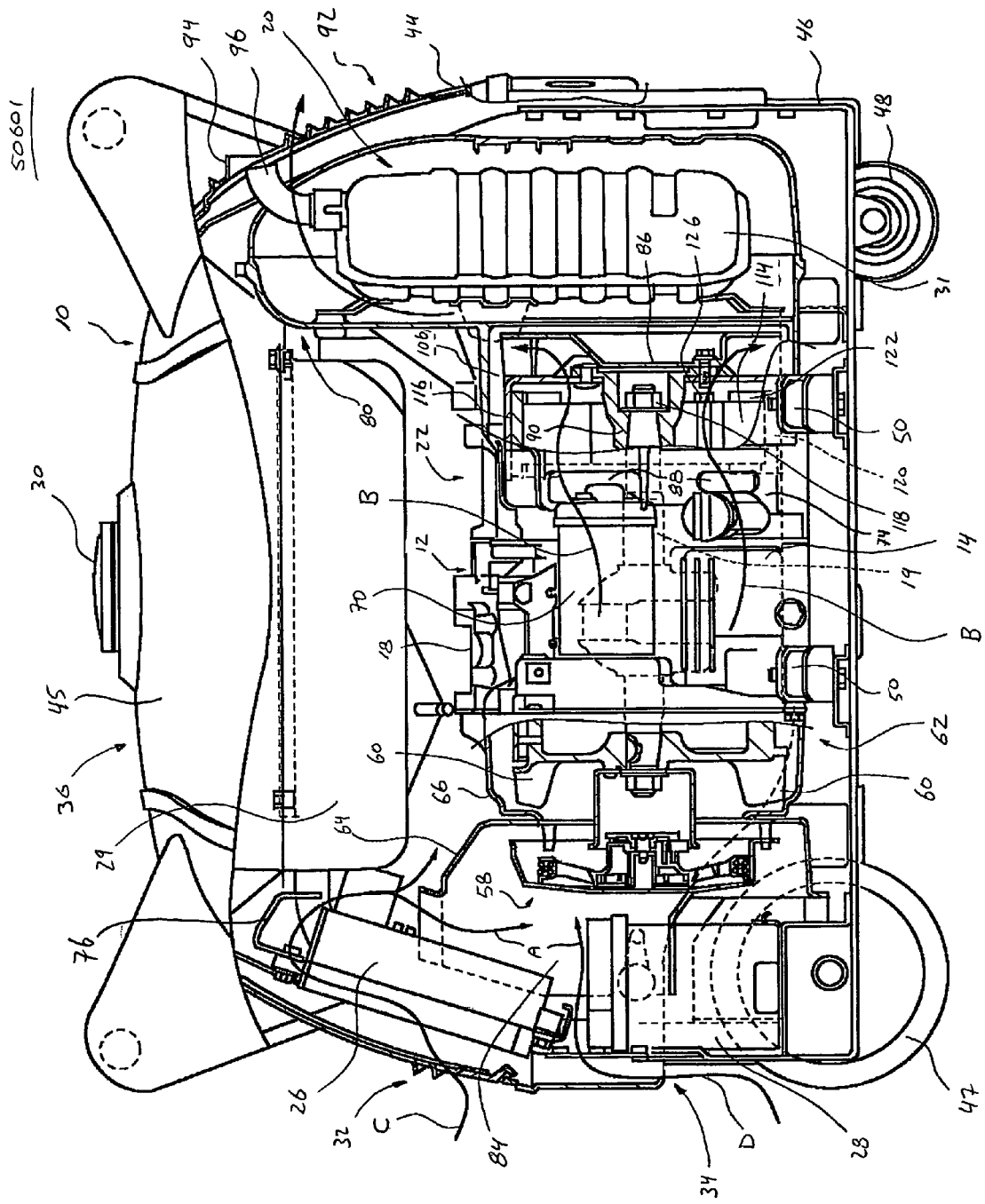
FIG. 1 is a front view of a power generator unit that is configured in accordance with a preferred embodiment of the present invention. An external cover (i.e., housing) of the power generator unit is sectioned so as to expose several of the internal components within the power generator unit. The figure also illustrates distinct internal cooling air paths through the cover. The cooling air paths are shown in solid bold lines.
Figure 4:
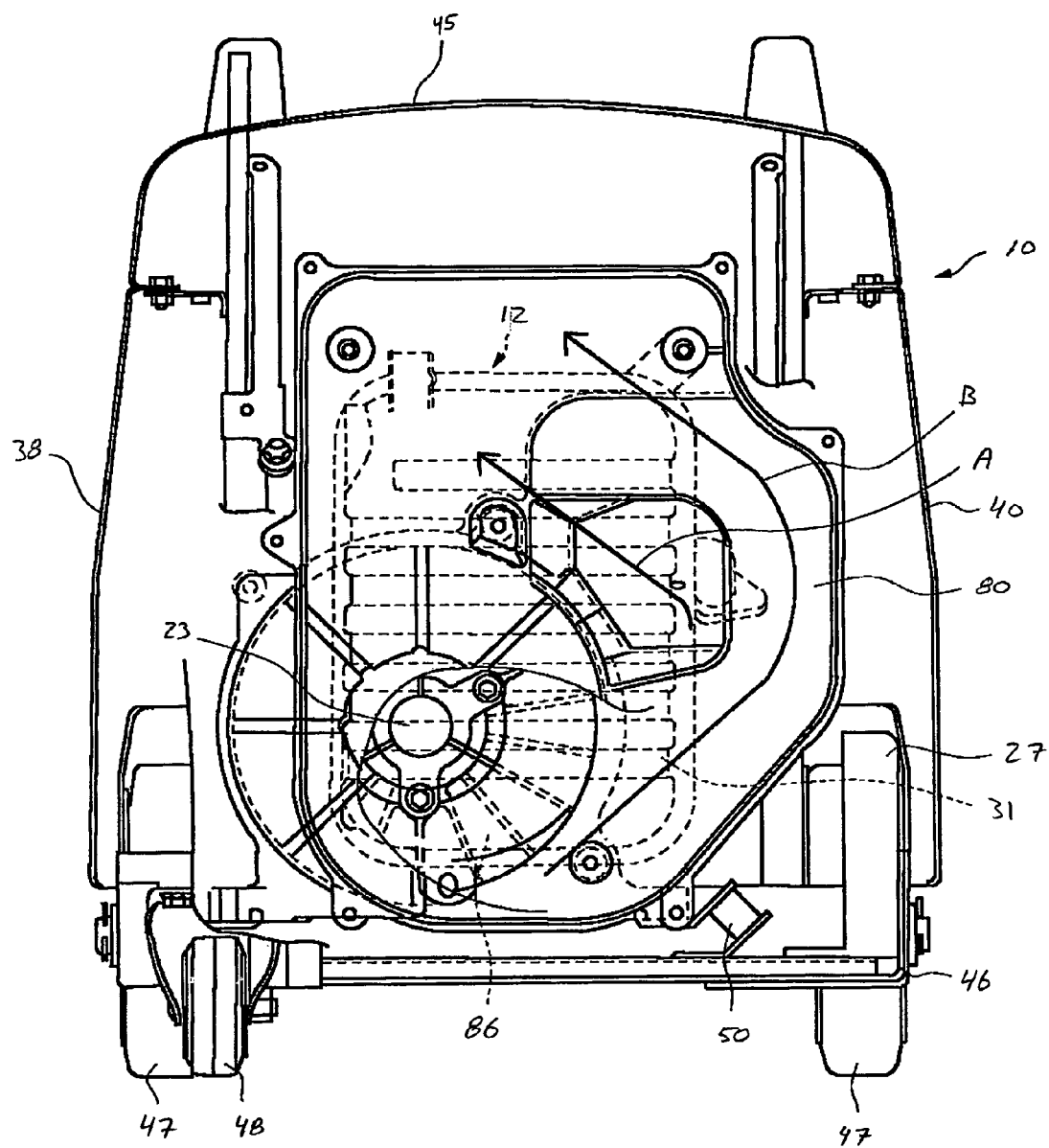

FIG. 4 is a right side sectional view of the power generator unit of FIG. 1 with a muffler shown in phantom. This figure also illustrates the cooling air path from a side view; again, the cooling air paths are shown in solid bold lines.

Figure 5:
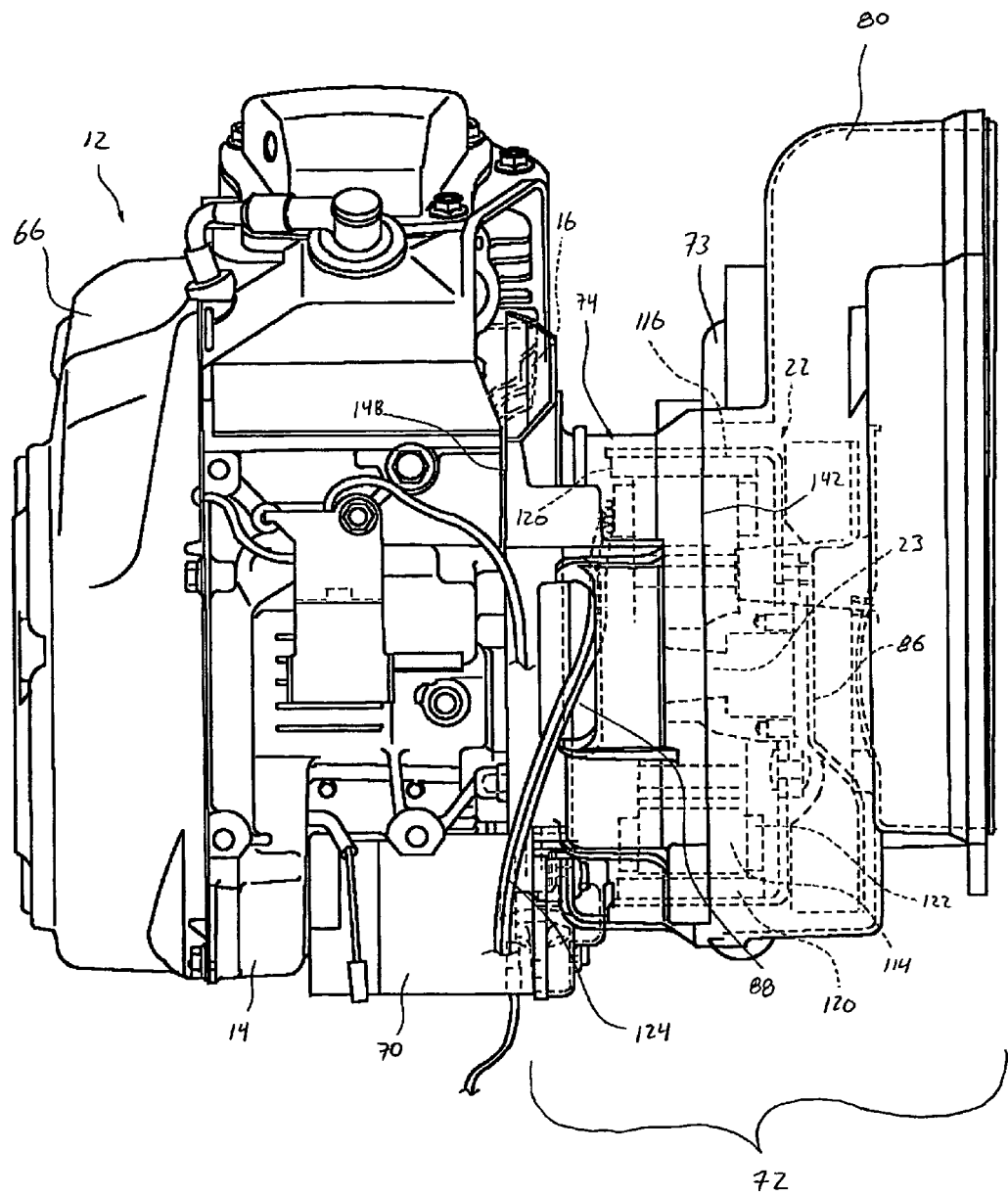

FIG. 5 is a front elevational view of an engine-generator assembly of the power generator unit of FIG. 1.

Figure 6:
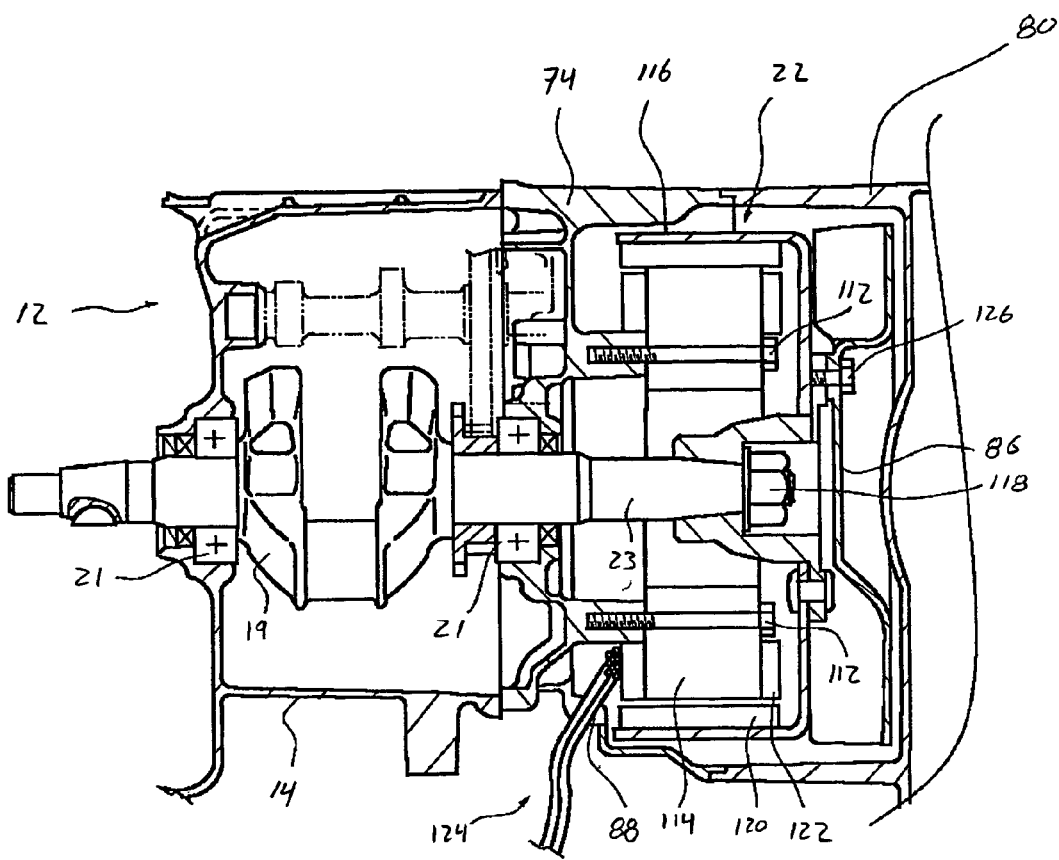

FIG. 6 is a cross sectional view of the engine-generator assembly of the power generator unit of FIG. 1.

Figure 7:
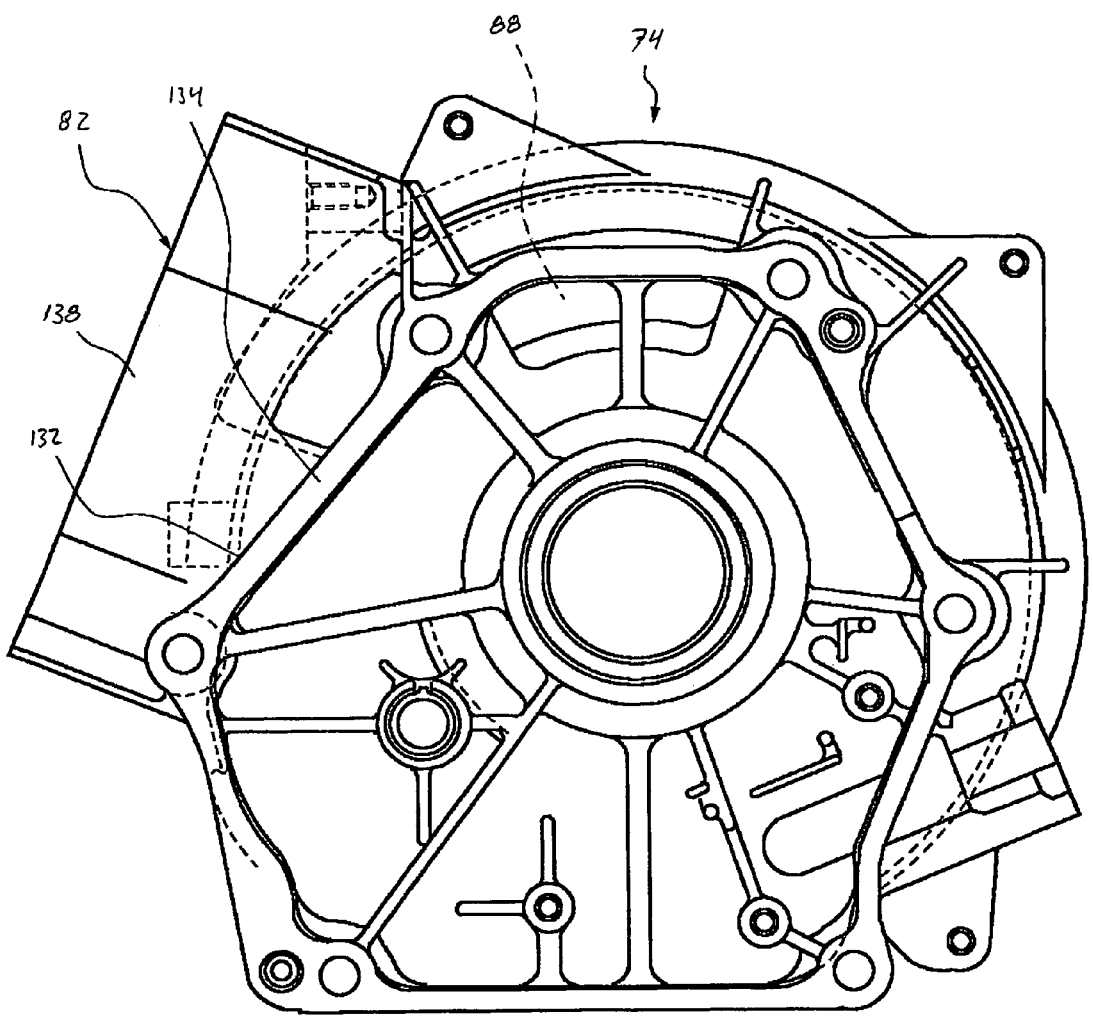

FIG. 7 is a left side view of a crankcase cover of the engine-driven assembly of FIG. 5, showing a crankcase side of the crankcase cover.

Figure 8:
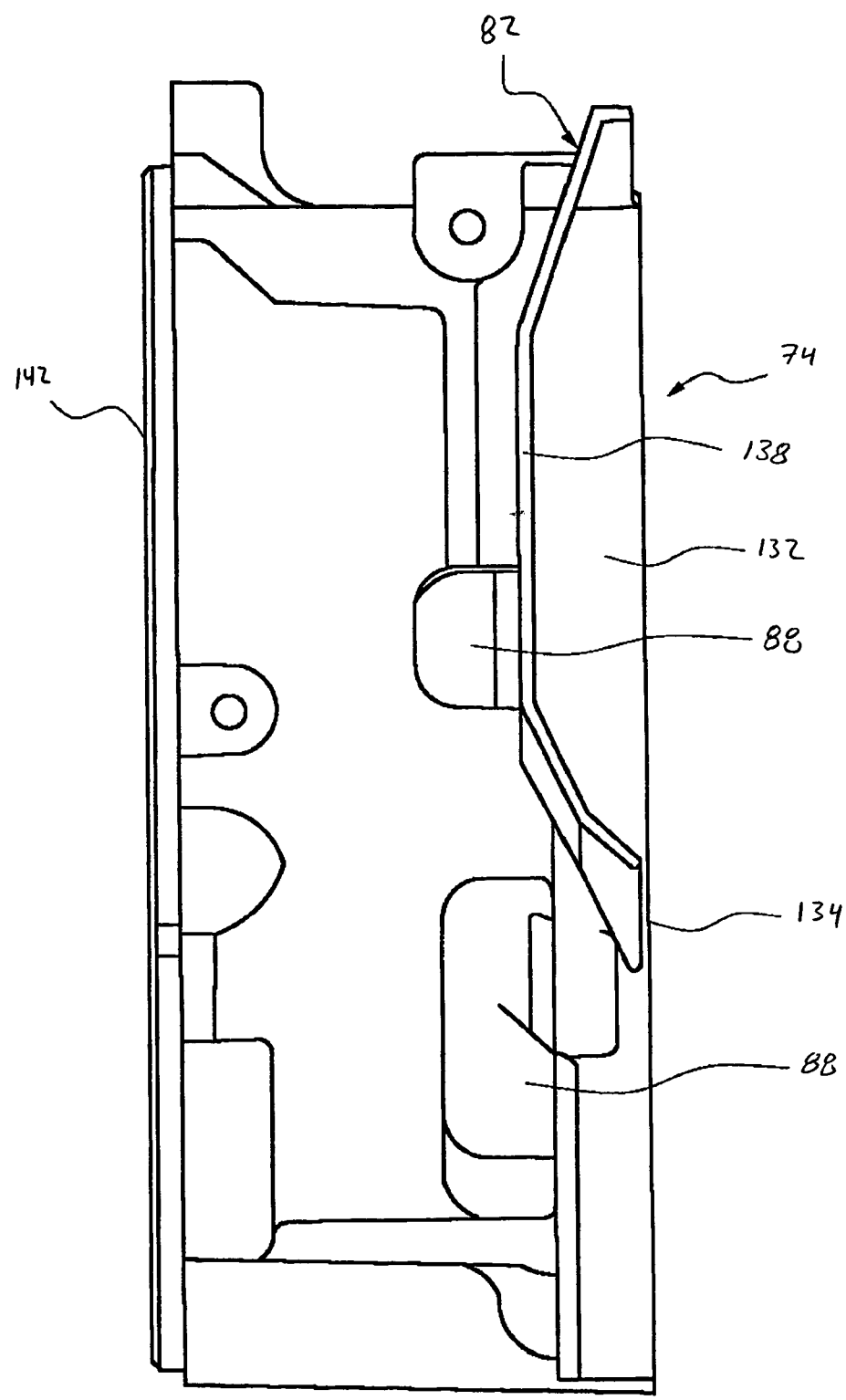

FIG. 8 is a rear view of the crankcase cover of FIG. 7.

Figure 9:
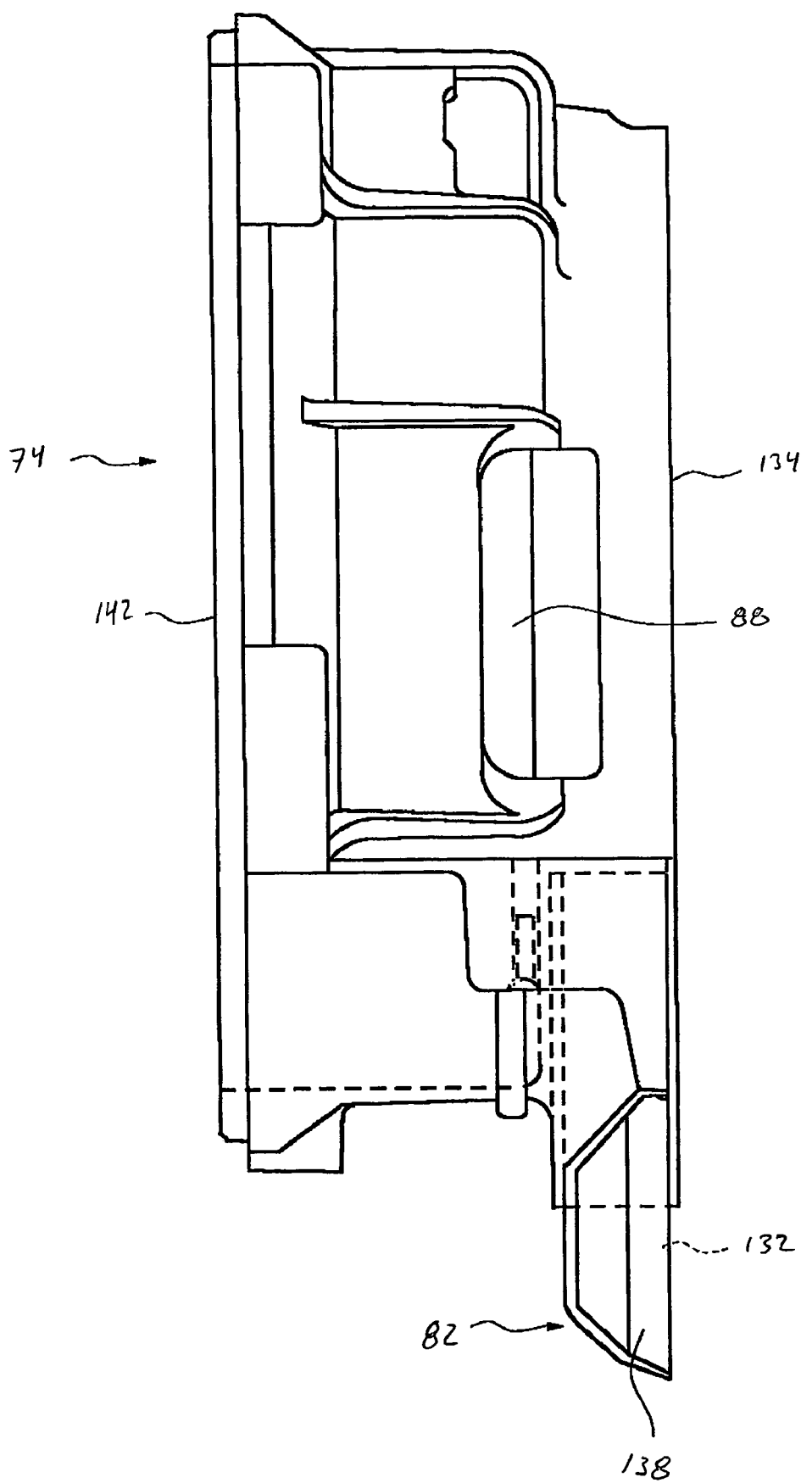

FIG. 9 is a top view of the crankcase cover of FIG. 7, showing an inside structure of the crankcase cover in phantom.

Figure 10:
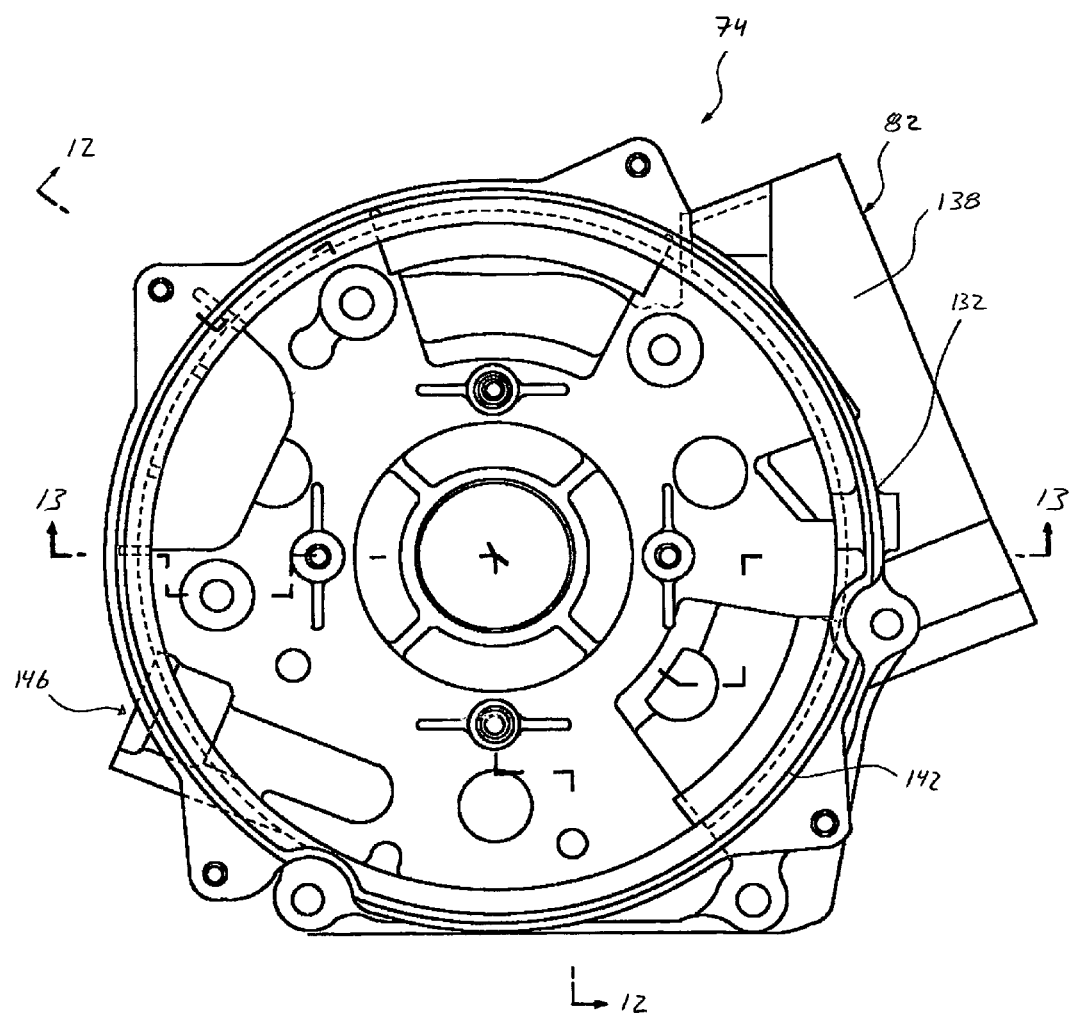

FIG. 10 is a right side view of the crankcase cover of FIG. 7, showing various mounting bosses to attach the generator.

Figure 11:
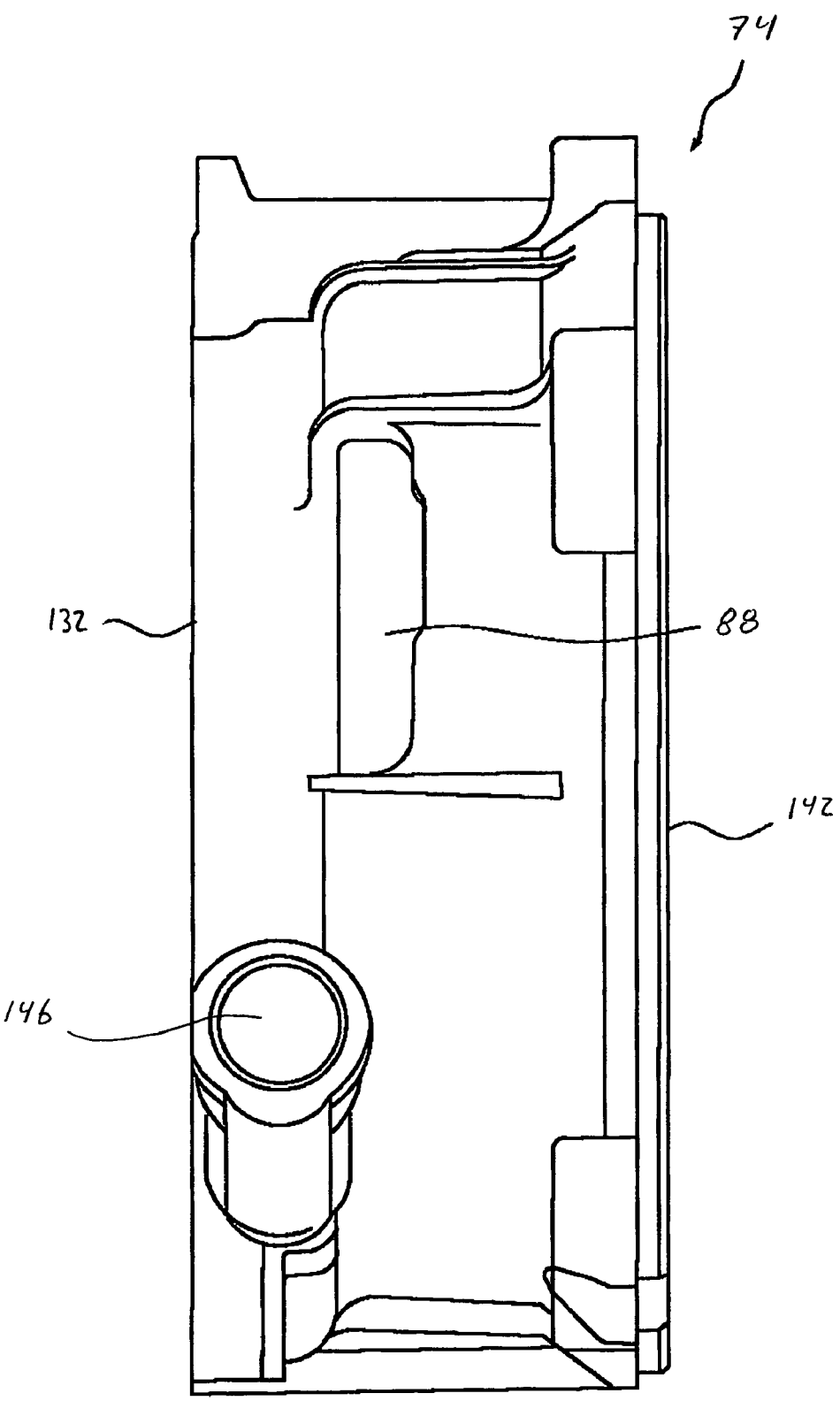

FIG. 11 is a front view of the crankcase cover of FIG. 7, showing an oil filler hole.

Figure 12:
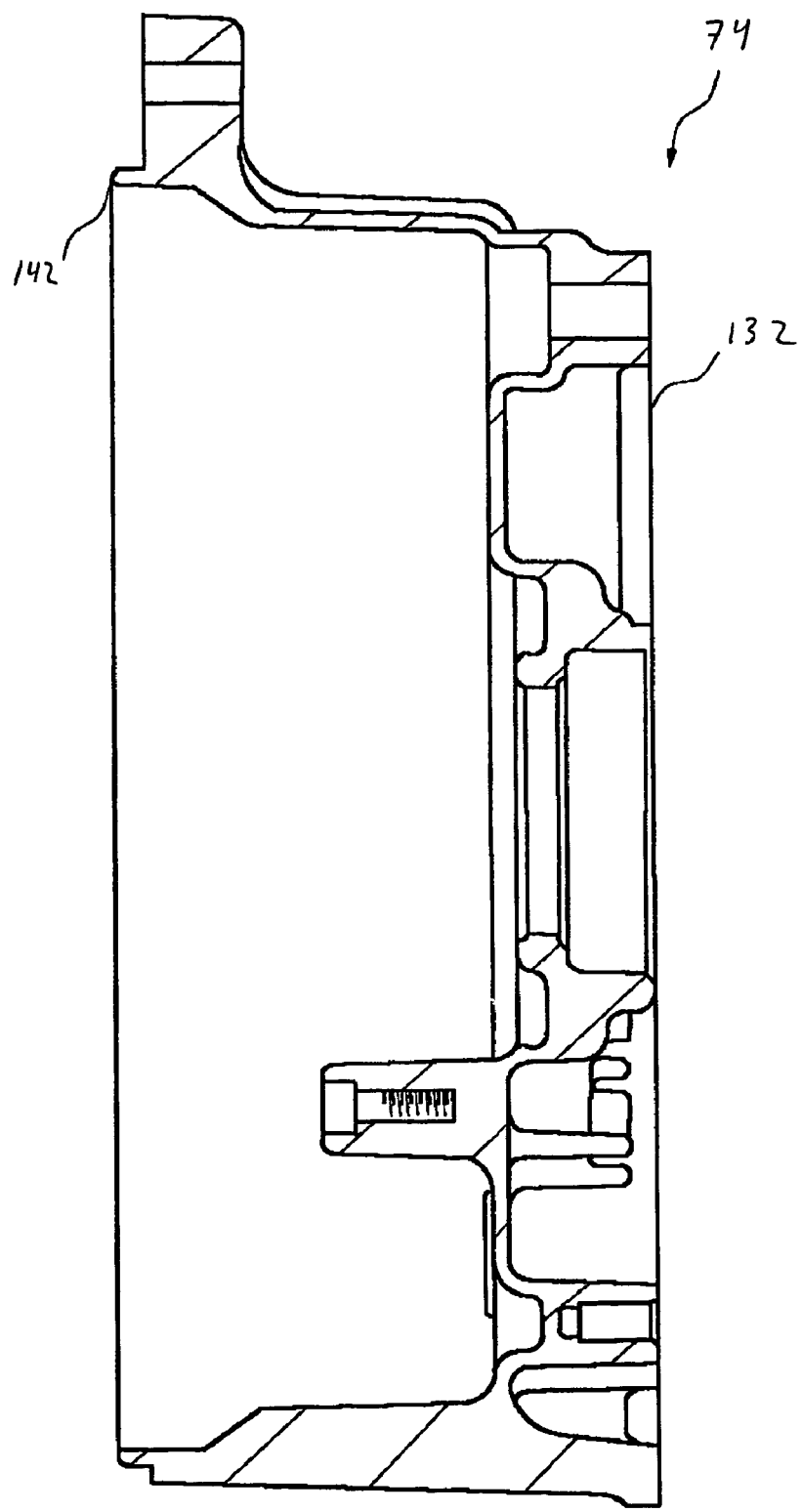

FIG. 12 is a sectional view of the crankcase cover taken along section line 12—12 of FIG. 10 and illustrates a mounting boss and the internal structure of the crankcase cover.

Figure 13:
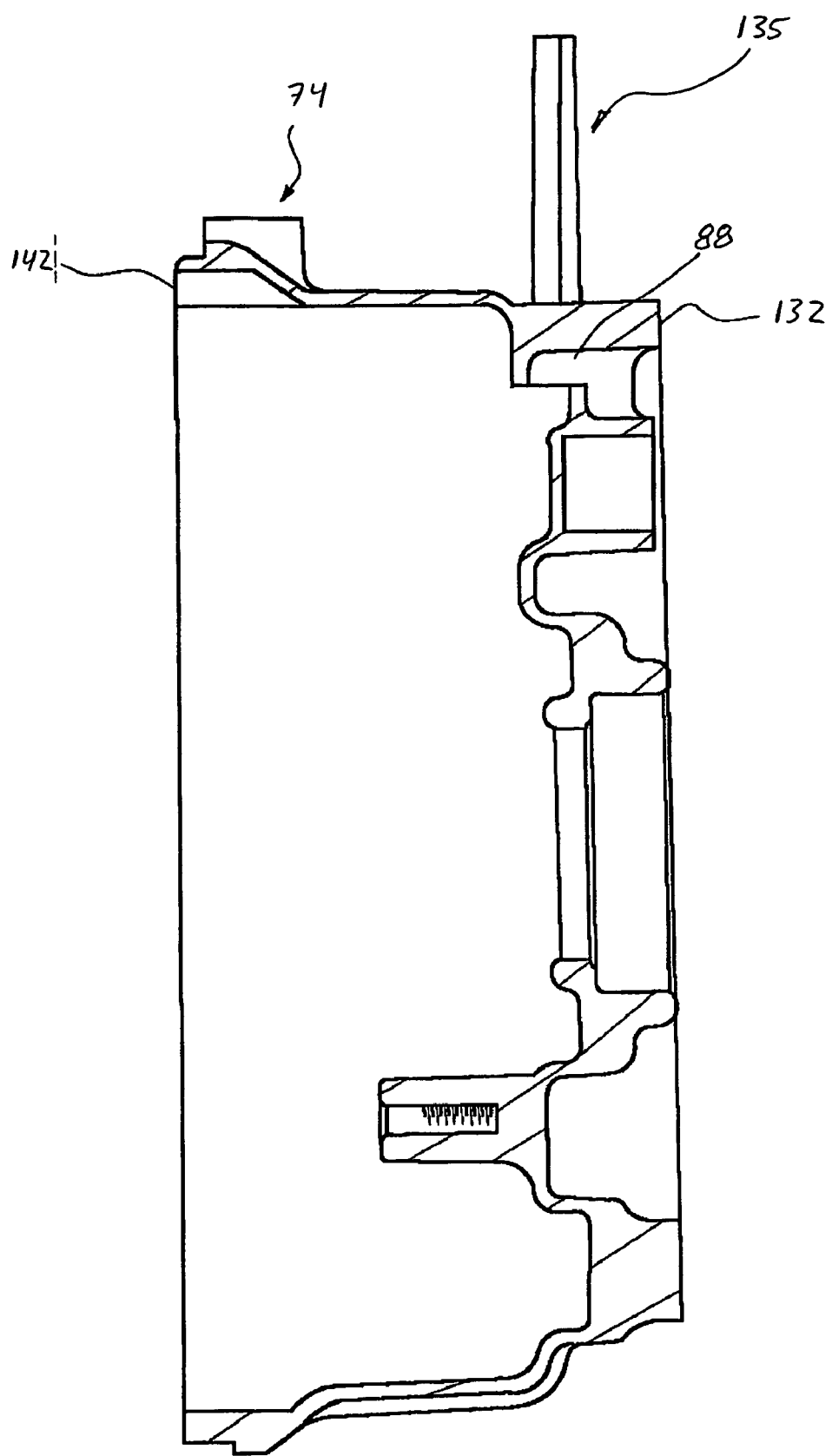

FIG. 13 is a sectional view of the crankcase cover taken along section line 13—13 of FIG. 10 and illustrates another mounting boss and the internal structure of the crankcase cover.

Figure 14:
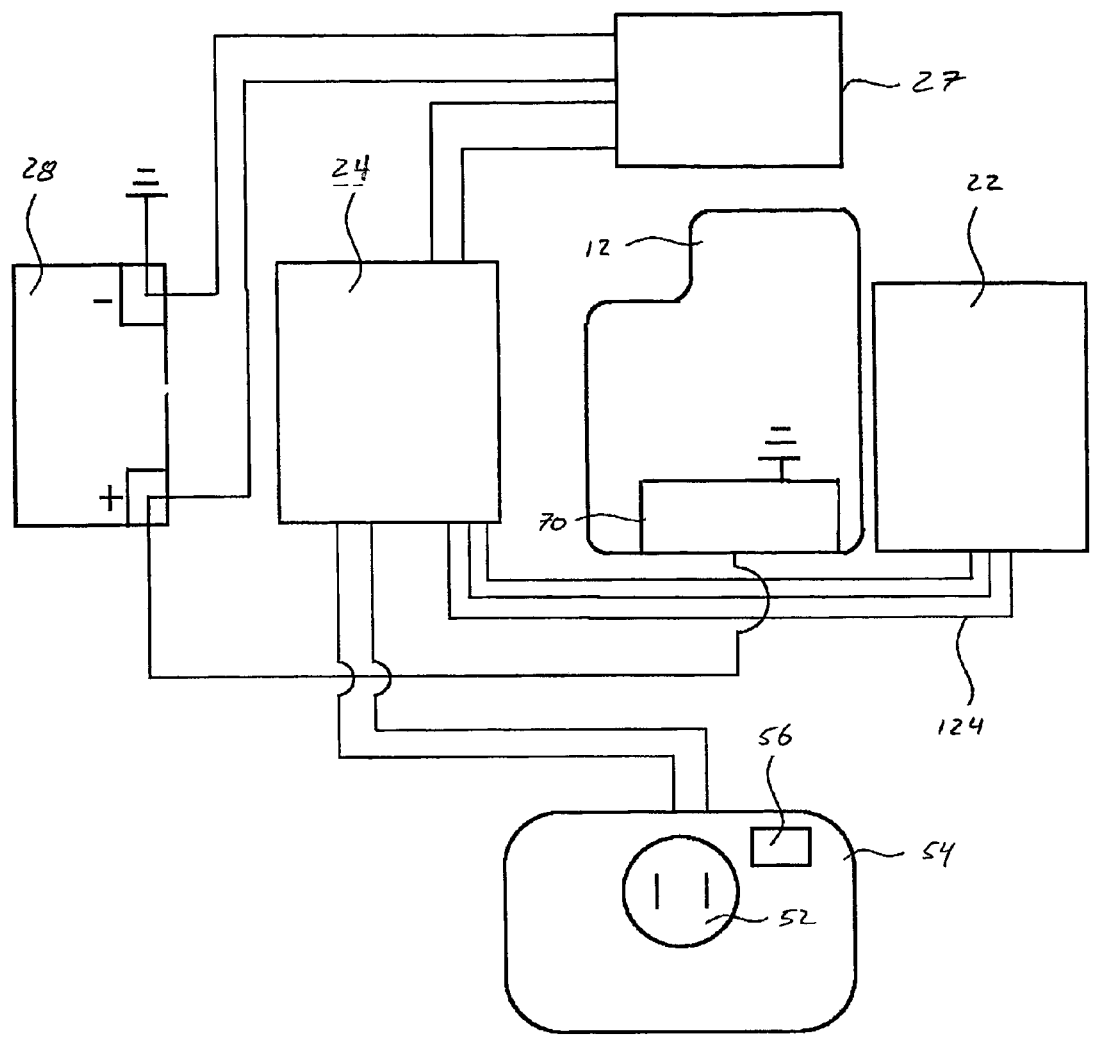

FIG. 14 is an electrical schematic diagram of the power generator unit of FIG. 1, showing a power conversion unit, a battery, a DC-DC converter, and an electrical receptacle.

DETAILED DESCRIPTION OF THE PREFERRED EMBODIMENT OF THE PRESENT INVENTION

Figure 2:
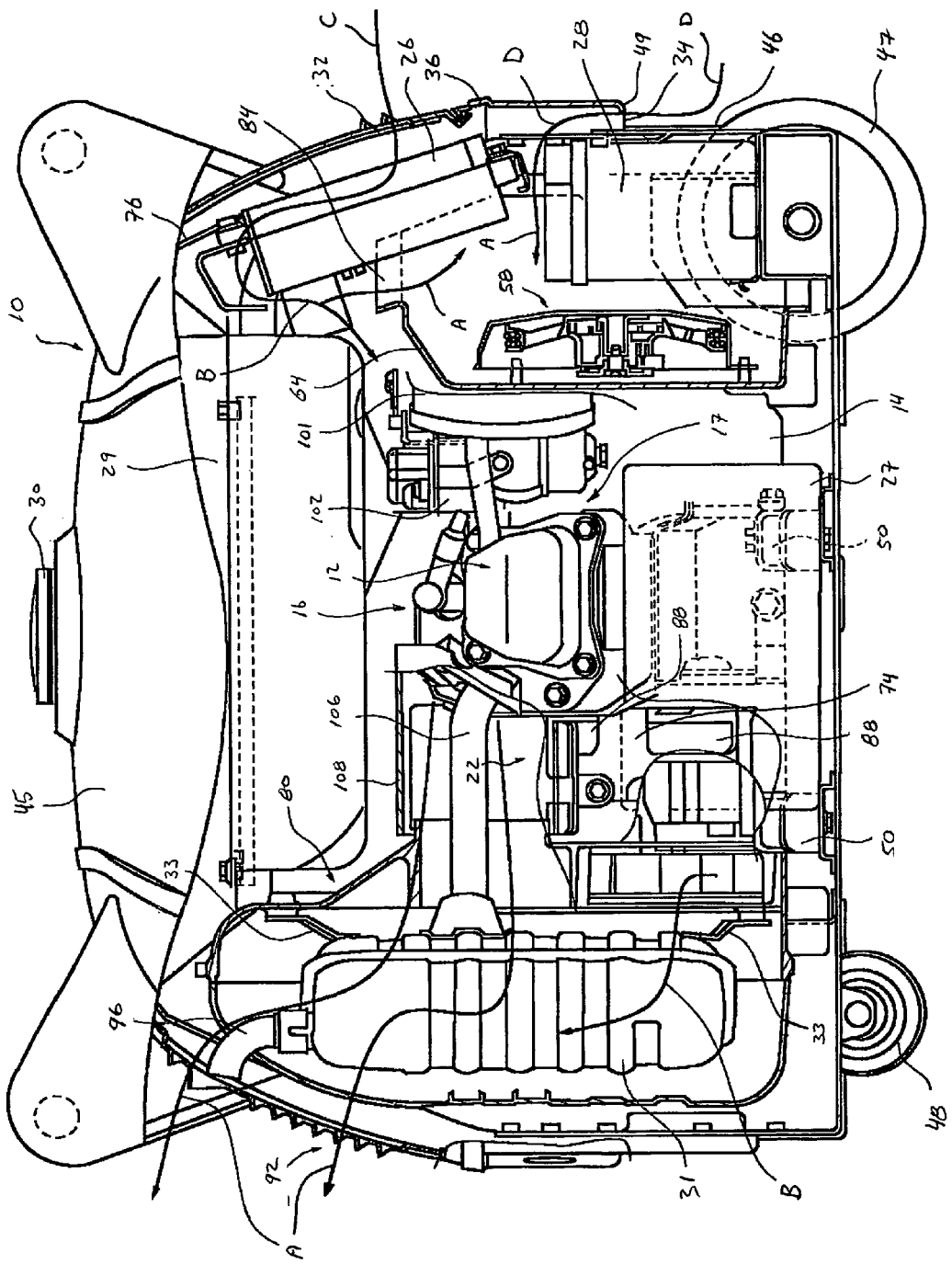
FIG. 2 is a rear view of the power generator unit of FIG. 1 with the external cover sectioned to illustrate the internal components of the power generator unit. The figure illustrates the cooling air paths; again, the cooling air paths are shown in solid bold lines.

With reference initially to FIGS. 1 and 2, an overall structure of a power generator unit 10 with various features, aspects and advantages of the present invention will be described. For purposes of describing the power generator unit 10, reference will be made to the unit as it is shown in FIG. 1. Thus, the terms "front," "rear," "left side," "right side," "top," and "bottom" are used in reference to the power generator unit 10 in the orientation shown in FIG. 1.

The illustrated power generator unit 10 generally comprises an internal combustion engine 12 that preferably operates on a four-stroke cycle combustion principle. The engine 12 includes a crankcase 14 and a cylinder 16 (FIG. 2) incorporating a cylinder bore (not shown), classifying the engine 12 as a single cylinder engine. The illustrated engine, however, merely exemplifies one type of engine in connection with which various aspects and features of the present invention can be used. Engines having a different number of cylinders, other cylinder arrangements, other cylinder orientations (e.g., upright cylinder banks, inline, boxer, V-type, and W-type), operating on other combustion principles (e.g., crankcase compression two-stroke, diesel, and rotary) and having different cooling systems (e.g., air cooling and water cooling) are all practicable with some or all aspects and features of the present invention. Many orientations of the engine are also possible (e.g., with a transversely or vertically oriented crankshaft).

A piston (not shown) reciprocates in the cylinder bore formed within the cylinder 16. A cylinder head 17 (FIG. 2) is affixed to the upper end of the cylinder 16 to close the upper end of the cylinder bore. The cylinder head member, the cylinder bore and the piston together define a combustion chamber (not shown). Multiple fins are incorporated on the cylinder 16 and cylinder head 17 to better dissipate engine-operating heat.

The crankcase 14 is affixed to the lower end of the cylinder 16 to close the lower end of the cylinder bore and to define, in part in the illustrated embodiment, a crankshaft chamber. A crankshaft 19 is journaled between at least two bearings 21 and is positioned between the cylinder 16 and the crankcase 14. The crankshaft is rotatably connected to the piston through a connecting rod (not shown), which preferably is attached to a crankpin of the crankshaft in a conventional manner.

The cylinder 16, the cylinder head 17, and the crankcase 14 together generally define an engine body of the engine 12. At least these components of the engine 12 preferably are made of an aluminum-based alloy, however, other materials can also be used.

The engine 12 preferably comprises a fuel supply system 18, an ignition system (not shown), and an exhaust system 20. Further details of engine function and mounting position of these systems will be described below.

An generator 22, and preferably an AC generator, is placed next to the engine 12 to be driven by the engine 12. A shaft of the generator 22 is an extension of the crankshaft of the engine 12 and rotates together with the engine crankshaft. The AC generator 22 generates an alternating current (AC) power.

The electronic control module 26 controls the output of the generator 22 and the output of the DC/DC converter 27 in addition to controlling the output of the power-converting unit 24. Preferably, the control module 26 comprises at least a central processing unit (CPU) and some form of memory or storage. The operation of the power-converting unit 26, the electronic control module 26, and the DC/DC converter 27 will be explained in greater detail below.

The electronic control module 24 controls the output of the generator 22 and the output of the DC/DC converter 27. Preferably, the control module 24 comprises at least a central processing unit (CPU) and some form of memory or storage. The operation of the electronic control module 24, and the DC/DC converter 27 will be explained in greater detail below.

FIG. 1 shows a sectional side view of the power generator unit 10 illustrating the electronic control module 24, a battery 28, a fuel tank 29, a fuel cap 30, the engine 12, the generator 22, and a muffler 31 securely fastened by a plurality of mounts 33 on a cover or housing 36. The cover 36 preferably is a multiple piece sound insulation cover and includes a plurality of cooling air vents. In the illustrated embodiment, the cover 36 includes several different air cooling vents, including a first set of cooling air intake vents 32 and a second cooling air intake vent 34.

In the illustrated embodiment, the multiple piece sound insulation cover 36 comprises a front piece 38, a rear piece 40, a left side piece 42, a right side piece 44, a top piece 45, and a frame 46 comprising a bottom tray. Each of the cover pieces 38, 40, 42, 44, 45, and the frame 46 can be formed by one or more elements. The various sound insulation covers are advantageously held together through various fasteners (not shown). The pieces 38, 40, 42, 44, 45, and the frame 46 can incorporate insulating fiber material or internal metal coverings to further improve the sound proofing of the insulating cover 36.

As noted previously, the various cooling air vents incorporated into the sound insulation cover include the first set of cooling air intake vents 32 and the second cooling air intake vent 34. In the illustrated embodiment, the vent opening of the second cooling air intake vent 34 is disposed generally below the vent openings of the first set of cooling air intake vents 32. The second cooling air intake vent 34 preferably is disposed next to the battery 28 and is formed between a lower edge 49 of the right side cover 44 and the frame 46. The shape of the second cooling air intake vent 34 and how it guides the air around the battery 28 forms a labyrinth acting to reduce noise. The raised location of the second air intake vent 34 also contributes to inhibit dust and dirt from entering inside the engine-driven generator 10.

The engine 12 is advantageously mounted to the frame 46 through a plurality of engine mounts 50. The engine mounts 50 can be made of a resilient material to reduce vibration and noise generated by the engine 12. Rear wheels 47 and front wheels 48, which are attached to the frame 46, allow the power generator unit 10 to be transported easily. One or both pairs of the wheels 47, 48 can be designed to swivel to providing improved maneuverability during transport.

A control panel 54 (FIG. 14) comprises various indicators, such as an engine start/stop switch 56, an economy switch (not shown), an AC voltage output 52, and a DC voltage output (not shown). While not illustrated in FIG. 1, the control panel preferably is located on the front side of the cover 36 so as to be easily accessed.

A recoil starter 58 is positioned next to the battery 28 and is attached to the crankshaft 19 along with an engine cooling fan 60 and a flywheel 62. The recoil starter 58 is located inside of a housing 64 that is formed to allow a portion of cooling air that enters the cover 36 to cool the recoil starter 58 and the engine crankcase 14. The engine cooling fan 60 rotates inside of an engine cooling fan housing 66 that further guides the cooling air from the housing 64, through the engine cooling fan 60 and at least towards the cylinder 16. The engine 12 can be started using the recoil starter 58 or through an electric starter 70 that cooperates with the engine. In the illustrated embodiment, the recoil starter 58 is positioned on the front side of the engine 12. The starter 70 preferably is also cooled by cooling air flowing along front side of the engine 12 before entering a crankcase cover 74 of a generator housing assembly 72. The generator housing assembly 72 comprises the crankcase cover 74, a generator cover 73, and a muffler housing 80 (FIG. 5).

A generally planar surface of the electronic control module 26 includes cooling fins. The electronic control module 26 is advantageously fastened through mounts 76 directly behind, but spaced apart from, the first set of cooling air intake vents 32. This direct mounting of the electronic control module 26 allows the cooling air to first contact the planar surface of the module 26 providing substantial cooling of the module 26. Mounting of the electronic control module 26 directly behind the first set of cooling air access intake vents 32 also acts to insulate the internal noise of the power generator unit 10, thereby providing quieter operation. The power generator operational noise is kept to a minimum even though air is allowed to freely enter the cooling intake vents 32 to efficiently cool internal components of the power generator unit 10.

The electronic control module 24 preferably includes cooling fins. In the illustrated embodiment, a generally planar surface of the electronic control module 24 includes the cooling fins. The electronic control module 24 is advantageously fastened through mounts 76 directly behind, but spaced apart from, the first set of cooling air intake vents 32. This direct mounting of the electronic control module 24 immediately next to the air intake vents 32 allows the cooling air to first contact the planar surface of the module 24 providing substantial cooling of the module 24. Mounting of the electronic control module 24 directly behind the first set of cooling air access intake vents 32 also helps insulate the internal noise of the power generator unit 10, thereby providing quieter operation. The power generator unit's operational noise is quieted even though air is allowed to freely enter the cooling intake vents 32 to efficiently cool internal components of the power generator unit 10.

A first portion C of the cooling air enters the air intake vents 32 and initially cools the electronic control module 26. The broad surface of the electronic control module 26 provides the cooling air with a large heat transfer surface over which the air passes. Another portion D of the cooling air enters the second cooling air intake vent 34 and initially cools the battery 28. The cooling air path A is established when air is drawn into the engine cooling fan housing 66 through a fan housing opening 84 by the engine-cooling fan 60. The air flows through the engine cooling fan 86, cools the engine cylinder 16 and the cylinder head 17. The cooling air is then deflected by an air deflector 82 and is guided into the muffler housing 80 to cool the muffler 31. Air traveling along the first cooling air path A advantageously flows through or over the warmer engine components allowing the cooler engine components, and other cooler components within the sound insulation cover 36, to remain at a cooler temperature. These other cooler components can include the fuel tank 76, the electronic control module 26, and various fuel lines.

Air flow along the second cooling air path B also originates from a portion of the cooling air that enters the air intake vents 32 and initially cools the electronic control module 26. The air flow along the second cooling air path B is also comprised of the other portion of the cooling air that enters the second cooling air intake vent 34 that initially cools the battery 28, starter motor 70, and the crankcase 14. A generator cooling fan 86 including at least one blade draws air into the crankcase/generator cover 74 through various cooling air intake vents 88. The generator cooling fan 86 is connected to the generator 22 through a fan hub 90. The drawn-in air passes through and cools the generator 22 and is guided by the arrangement of internal components within the crankcase/generator cover 74 to enter the muffler housing 80 to cool the muffler 31 and then to exit through a portion of a side cover effluent air vent 92. These two generally distinct cooling paths A, B are advantageously separated, thereby allowing efficient cooling of the warmer components of the power generator unit 10, as well as cooling of those components operating at a lower temperature within the power generator unit 10. Incorporated into the effluent vent 92, is an exhaust outlet recess 94 where a tail pipe 96 discharges exhaust gases to the outside environment.

Air flow along the second cooling air path B also originates from a portion of the cooling air that enters the air intake vents 32 and initially cools the electronic control module 24. The air flow along the second cooling air path B is also comprised of the other portion of the cooling air that enters the second cooling air intake vent 34 that initially cools the battery 28, starter motor 70, and the crankcase 14. A generator cooling fan 86 including at least one blade draws air into the crankcase cover 74 through various cooling air intake vents 88 (FIG. 2). The generator cooling fan 86 is connected to the generator 22 through a fan hub 90. The drawn-in air passes through and cools the generator 22 and is guided by the arrangement of internal components within the crankcase cover 74 to enter the muffler housing 80 to cool the muffler 31 and then to exit through a portion of a side cover effluent air vent or outlet opening 92. These two generally distinct cooling paths A, B are advantageously separated until they merge in muffler housing 80, thereby allowing efficient cooling of the warmer components of the power generator unit 10, as well as cooling of those components operating at a lower temperature within the power generator unit 10. Incorporated into the effluent vent 92 is an exhaust outlet recess 94 where a tail pipe 96, which is connected to the muffler 31, discharges exhaust gases to the outside environment.

Figure 3:
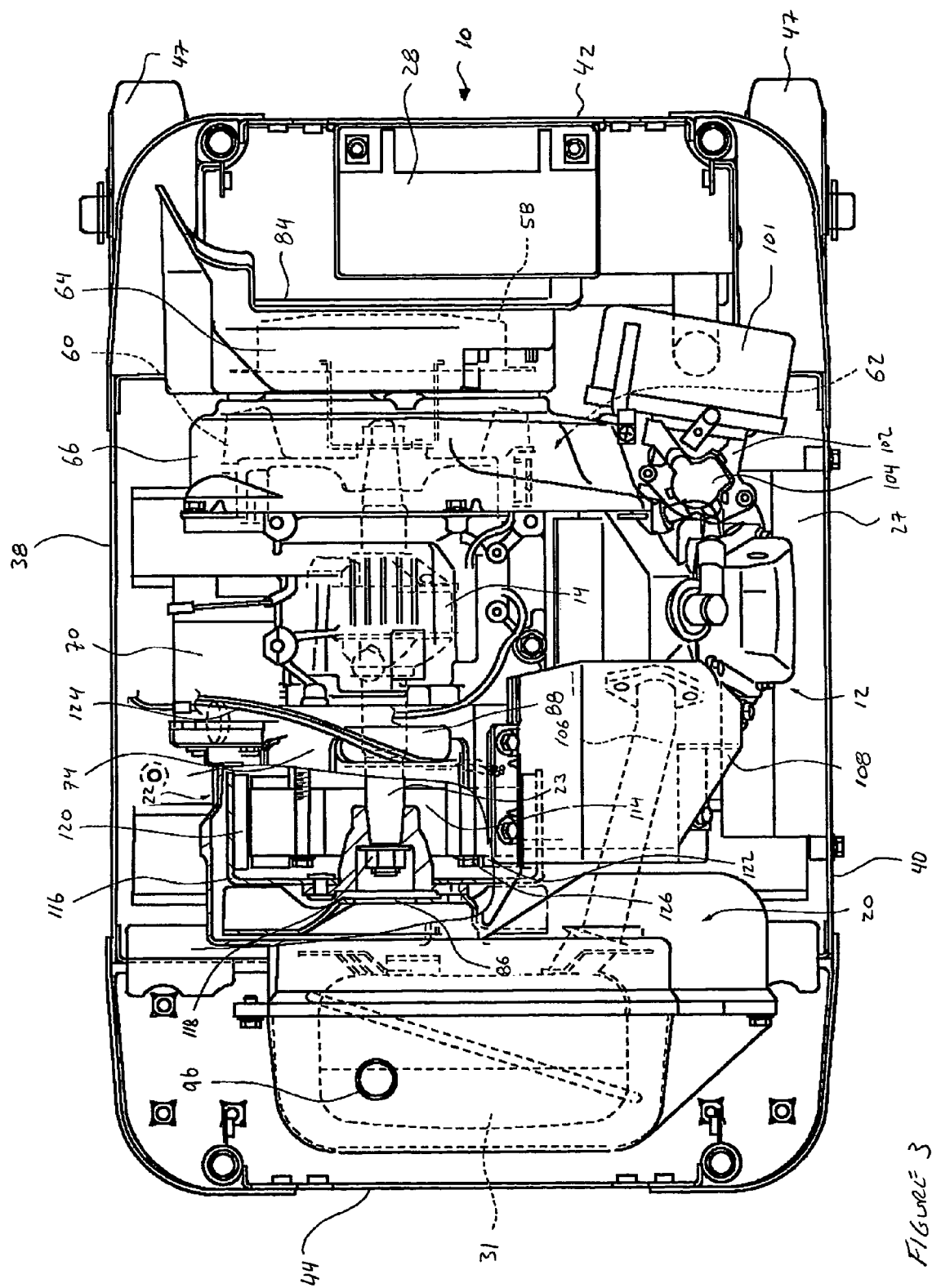
FIG. 3 is a top view of the power generator unit of FIG. 1 with the external cover sectioned to illustrates the internal components of the power generator unit from the top side.

FIG. 3 is a top sectioned view of the power generator unit 10 illustrating another perspective of the various components of the power generator unit 10. The battery 28 is positioned away from the warmer engine 12 and the muffler 31. Cooling air that flows along the second air-cooling path B, which is used to cool the crankcase 14 and generator 22, does not pass through the hotter engine cylinder head 17 so as to keep the generator 22 at a lower operating temperature.

With further reference to FIG. 3, air is drawn into an intake system 100 of the engine 12 and is delivered through an air cleaner 101 to a carburetor 102 where the air is combined with fuel to form an air/fuel mixture. The carburetor incorporates a throttle valve (not shown) that regulates an amount of the air/fuel mixture delivered to the combustion chamber of the engine 12. The air/fuel mixture amount can change in response to a position of the throttle valve, i.e., a throttle opening position. A manual throttle lever (not shown) or a stepper motor 104 can actuate the throttle valve. The greater the opening degree of the throttle valve, the greater the amount of the air/fuel mixture and the higher the engine speed. Additionally, while the charger former is illustrated as a carburetor, other types of charger formers (e.g., one or more fuel injectors) can also be used with the engine of the power generator unit 10.

The air/fuel mixture is ignited by the ignition system (not shown) at a predetermined crankshaft position and the engine 12 produces a force when a rapid heat expansion occurs as a result of the air/fuel mixture combusting in the combustion chamber. The force is applied to the piston and is translated into a rotational force through the connecting rods and crankshaft. A combusted mixture, i.e. exhaust gases, are routed to an external location through an exhaust pipe 106 and the muffler 74.

FIG. 3 further illustrates the generator 22 being mounted within a recess inside the crankcase cover 74. In addition to supporting the generator 22, the crankcase cover 74 further guides the generator cooling air path through the cooling air intake vents 88 to efficiently cool the generator 22.

Additional engine covers help define the cooling air paths within the cover 36. Such engine covers can include an exhaust pipe cover 108 as well as the generator housing assembly 72 assembled together to form a generally complete shrouding for engine 12 and the generator 22. This complete shrouding ensures proper cooling of the engine 12 and the generator 22 along with quiet operation.

With reference to FIG. 4, a right side view of the power generator unit 10 is illustrated. The cooling air path A exits the space defined between the exhaust pipe cover 108 and the engine after cooling the engine cylinder 16, the cylinder head 17 and the exhaust pipe 106 and enters a mid section of the muffler housing 80. The cooling air path B exits the generator cover 73 and enters a lower area of the muffler housing 80. The cooling air from the cooling air path A and the cooling air path B is then distributed throughout the muffler housing 80 to effectively cool the muffler 31. The cooling air form both cooling air paths A, B then exits the power generator unit 10 through the side cover effluent air vent 92.

With reference to FIGS. 5 and 6, the generator 22 is positioned in the crankcase/generator cover 74 assembly to the right of the engine 12 in the illustrated embodiment at a location generally next to the muffler 31. The generator 22 incorporates a stator 114 fastened to the crankcase/generator cover 74 through fasteners 112 and a rotor 116 connected (either directly or indirectly through a gear train or another transmitter or shaft) to the crankshaft power take off end through a nut 118 so that an electrical charge is generated as the rotor 116 is rotated by the crankshaft 19. In the illustrated embodiment, the rotor 116 is disposed around the stator 114; however, in other embodiments, the rotor can be disposed within the stator. Permanent magnets 120 attached to the rotor 116 induce electrical current in coils 122 of the stator 114. The current induced in the coils 122 is delivered to the electronic control module 24 through a wiring harness 124. The generator cooling fan 86 is positioned to the right of the generator 22 and is fastened to the rotor 116 through bolts 126 so as to rotate with the rotor 116 and the crankshaft 19. The generator cooling fan 86, as it rotates, draws external cooling air through the various cooling air intake vents 88 on the crankcase cover 74. The cooling air is then exhausted through the muffler housing 80 and discharged through the vent 92.

The crankcase cover 74 and the generator cover 73 are designed to assist in guiding the cooling air to efficiently cool the generator 22, and to allow the cooling air to enter the muffler housing 80. FIG. 6 illustrates the generator 22 positioned within the crankcase/generator cover 74. The cooling air intake vents 88 preferably are incorporated into a side of the crankcase/generator cover 74.

FIGS. 7–13 illustrate views of the crankcase cover 74 in greater detail. FIG. 7 is a left side view of the crankcase cover 74. A crankcase mounting portion 132 preferably incorporates a mounting surface 134 that advantageously matches in shape a corresponding mounting surface 136 of the crankcase 14. When assembled, the crankcase/generator cover 74 strengthens the overall crankcase construction and encloses a sealed crankcase cavity that holds a lubricant for lubrication of the various moving parts within at least the crankcase 14. The air deflector plate 82 has a protruding surface 135 and an arched inner surface 138 that along with an outer surface of the crankcase mounting area 132 guides the cooling air from the engine cylinder 16 with the cooling air from the cylinder head 17 to the muffler housing 80. The cooling air from the cylinder head 17 is also therefore guided directly to the muffler housing 80. The arched inner surface of the air deflector plate 82 partially surrounds the stator 114 and rotor 116 of the generator 22.

With reference to FIG. 10, a right side view of the crankcase/generator cover 74 shows the area where the generator 22 is mounted to the crankcase/generator cover 74. A generator mounting area 142 of the crankcase/generator cover 74 preferably incorporates a circular size and shape closely matching the size and shape of the generator 22. This similar size and shape of the generator mounting area or recess 142 allows the cooling air to efficiently cool the generator by through the generator 22 and to inhibit the cooling air from traveling around the generator 22. The cooling air intake vents 88 also encourage the cooling air to pass through the generator 22 instead of immediately escaping the generator 22 in the opposite direction against the cooling air flow. A plurality of securing boss members permit the crankcase/generator cover 74 to be securely attached to the engine 12 and to allow other covers to be secured.

With reference to FIG. 10, a right side view of the crankcase cover 74 shows the area where the generator 22 is mounted to the crankcase cover 74. A generator mounting area 142 of the crankcase cover 74 preferably incorporates a circular size and shape closely matching the size and shape of the generator 22. This similar size and shape of the generator mounting area 142 allows the cooling air to efficiently cool the generator by generally forcing the cooling air to flow through the generator 22 and to inhibit the cooling air from traveling around the generator 22. The cooling air intake vents 88 also encourage the cooling air to pass through the generator 22 instead of immediately escaping the generator 22 in the opposite direction against the cooling air flow. A plurality of securing boss members permit the crankcase/generator cover 74 to be securely attached to the engine 12 and to allow other covers to be secured.

The muffler housing 80 also acts as a right side cover of the generator housing assembly 72. The cooling air being drawn into the crankcase cover 74 exits the generator 22 through the generator cover 73 and directly into the muffler housing 80 to cool the muffler 31. The size and shape of the cooling air passage from the generator cover 73 to the muffler housing 80 is designed to contribute to improved cooling of the generator and muffler. The cooling air enters the crankcase cover 74 to cool the generator 22 through the cooling air intake vents 88. The cooling air is then only allowed to enter the muffler housing 80 through the cooling air passage from the generator cover 73 to the muffler housing 80 to cool the muffler 31. Allowing the cooling air to only enter the crankcase cover 74 and leave the generator cover 72 in predetermined areas forces the cooling air to contact more surface area of the generator components instead of quickly leaving the generator cover 73. Forcing the cooling air to contact more surface area of the generator components allows the cooling air to draw more heat away from the generator 22.

FIG. 11 illustrates a front side view of the crankcase/generator cover 74. The various cooling air intake vents 88 can be seen. Cooling air is drawn into the crankcase/generator cover 74 by the generator fan 86 to cool the generator 22. A lubricant filler hole 146 communicates with the crankcase side of the crankcase/generator cover 74 and allows lubricant to filled to a specified level within the crankcase 14.

FIG. 12 illustrates the cross sectional view of the crankcase/generator cover 74 taken along the sectional line 12—12 of FIG. 10. FIG. 13 illustrates the cross sectional view of the crankcase/generator cover 74 taken along the sectional line 13—13 of FIG. 10 and show the detail of the mounting bosses and cooling air intake vents 88. The detail of a mounting edge 148 of the cover 74 that is made to correctly position the cover 74 within the crankcase 14 can also be seen.

FIG. 14 illustrates an electrical schematic of various components of the engine-driven generator 10. The generator 22 driven by the engine 12 produces a 3 phase alternating current (AC) voltage to the electronic control module 24. The electronic control module 24 converts the 3 phase AC voltage from the generator 22 to a predetermined AC voltage with a predetermined frequency to the voltage receptacle 50. The electronic control module 24 can also convert the AC voltage from the generator 22 to a predetermined direct current (DC) voltage to a DC-DC converter 152. The DC-DC converter 152 converts the predetermined DC voltage from the electronic control module 24 to a predetermined DC voltage that corresponds with a voltage of the battery 28. The battery 28 can be charged through the DC voltage received from the DC-DC converter. The battery 28 can also provide a DC voltage to the DC-DC converter allowing the battery 28 to power the starter motor 70. Using the DC-DC converter 152 to convert a lower battery voltage into a higher DC voltage to power the starter motor 70 allows the use of a small battery. A small battery allows a more compact construction and a lighter overall weight of the engine-driven generator 10.

The battery 28 can also provide a DC voltage to the DC-DC converter providing a boost of additional DC voltage and current to the electronic control module 24. This boost of additional DC voltage and current is delivered to the electronic control module 24 where it is converted to the predetermined AC voltage with the predetermined frequency and delivered to the voltage receptacle 50. This additional AC voltage allows the engine-driven generator 10 to deliver extra electrical power when needed, for example when a large current drawing load is started. A large current drawing load can be, for example, but not limited to an air conditioner, a refrigerator or various tools.

Although this invention has been disclosed in the context of a certain preferred embodiment, examples and variations thereof, it will be understood by those skilled in the art that the present invention extends beyond the specifically disclosed embodiment and variations to other alternative embodiments and/or uses of the invention and obvious modifications and equivalents thereof. In addition, while a number of variations of the power generator unit have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. It should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A power generator unit comprising a housing including at least two air inlet openings and at least one outlet opening, an engine disposed at least partially within the housing, a muffler communicating with the engine through an exhaust conduit, a generator driven by the engine and disposed at least partially within the housing, a first fan driven by the engine and disposed on one side of the engine and a second fan driven by the engine and disposed on the other side of the engine, a battery disposed within the housing immediately next to but spaced apart from one of the air inlet openings, an electronic control module communicating with at least one of the engine and generator so as to control at least one operational characteristic of the power generator unit, the electronic control module positioned immediately next to, but spaced apart from the other air intake opening, each intake opening communicating with an interior space within the housing in which air that flows through the one air inlet opening and over the battery merges with air that flows through the other air inlet opening and over the electronic control module, the first fan drawing air from the interior space and communicating with a first air path that extends from the first fan, across at least portions of the exhaust conduit and the muffler, to the air outlet opening, and the second fan drawing air from the interior space and communicating with a second air path that passes across the generator and over at least a portion of the muffler before exiting the outlet opening.

2. The power generator unit of claim 1, wherein the engine includes a crankcase formed at least in part by a crankcase cover and an output shaft extending through the crankcase cover to couple with the generator, the crankcase cover including a recess that receives at least a portion of the generator.

3. The power generator unit of claim 2, wherein the crankcase cover includes at least one opening through which the second fan draws cooling air into the crankcase cover and over at least a portion of the generator.

4. The power generator unit of claim 3, additionally comprising a generator cover that encloses the generator inside the crankcase cover and includes at least one opening through which the second fan blows cooling air from the crankcase cover into a muffler housing that surrounds at least a portion of the muffler.

5. The power generator unit of claim 4, wherein the muffler is mounted to the generator cover.

6. The power generator unit of claim 5, wherein the muffler housing encloses the muffler and includes at least one opening through which the second fan blows cooling air from the muffler housing through the air outlet opening.

7. The power generator unit of claim 4, wherein a guide member on the generator cover comprises a protruding surface and an arched surface.

8. The power generator unit of claim 7, wherein the arched surface of the guide member partially surrounds a rotor of the generator.

9. The power generator unit of claim 2, wherein the output shaft is a crankshaft that includes at least one crankpin disposed within the crankcase and a power-take-off end that is disposed outside the crankcase within the recess of the recess of the crankcase cover, the power-take-off end of the crankshaft being directly connected to a rotor of the generator.

10. The power generator unit of claim 1, wherein the engine has a crankshaft, the first fan is driven off one side of the crankshaft, and the generator is driven off the other side of the crankshaft.

11. The power generator of claim 1, wherein the first fan is connected to the crankshaft on the side of the engine closest to the air intake openings.

12. The power generator unit of claim 1, wherein the engine directly drives a flywheel that comprises the first fan.

13. The power generator unit of claim 1, wherein the air intake openings are disposed on one side of the cover, at least the first fan is arranged to draw in external air through the air intake openings, the engine being disposed downstream of a flywheel, and the outlet opening being disposed downstream of the engine.

14. The power generator of claim 1, wherein the housing completely encloses the engine and the generator.

15. The power generator unit of claim 1, wherein the housing includes a bottom portion, and the engine, the generator and the battery are each mounted to the bottom portion of the cover.

16. The power generator unit of claim 1 additionally comprising a fuel tank disposed at an elevated position relative to the engine with the housing and arranged within the cover to lie next to the electronic control module.

17. The power generator unit of claim 1, wherein the housing includes at least one portion comprising a sound insulating material.

18. A power generator unit comprising a cover having at least a first air intake opening, a second air intake opening, and a discharge opening, an engine including a first body portion that defines, at least in part, a combustion chamber, a second body portion that defines, at least in part, a crankcase chamber and is disposed next to the first body portion, and at least one muffler that receives exhaust gases from the combustion chamber, a generator driven by the engine, the generator being mounted inside a generator housing, at least a first fan and a second fan, each fan driven by the engine, the first and second air intake openings being disposed on one side of the cover, the engine being disposed downstream of the first fan, and the discharge opening being disposed downstream of the engine, whereby a first cooling air path occurs when the engine drives the first fan to draw external air through both air intake openings to cool at least the first body portion of the engine and thence to discharge heated air through the discharge opening, the second air intake opening being disposed relative to the first and second fans such that at least a portion of external air drawn through at least one of the air intake openings passes into the generator housing through air vents located in the generator housing and between the first and second fans, through the second fan so as to produce a second cooling air path, and exits the cover through the discharge opening, the generator being disposed generally in the second cooling air path.

19. The power generator unit of claim 18, wherein the generator housing forms, at least in part, the crankcase chamber.

20. The power generator unit of claim 18, wherein the second fan includes a rotatable blade and the generator housing is disposed around at least a side of the blade that faces away from the engine, the generator housing defining at least one influent opening for the air to enter the second fan, the influent opening being disposed on a side of the generator housing.

21. The power generator unit of claim 18, wherein the first body portion of the engine includes at least one cooling fan.

22. The power generator unit of claim 18, wherein the muffler is disposed between the first body portion of the engine and the discharge opening so as to lie in both cooling air paths.

23. The power generator unit of claim 18, wherein the muffler is offset generally to one side of a rotational axis of the second fan.

24. The power generator unit of claim 18 additionally comprising an electronic control module communicating with at least one of the engine and generator so as to control at least one operational characteristic of the power generator unit, and the module is disposed between the first air intake opening and the first fan.

25. The power generator unit of claim 18 additionally comprising a guide member disposed on the generator housing to separate the first cooling air path from the second cooling air path, the guide member being configured to direct cooling air, which has flowed along the first cooling air path; away from the second cooling path and into a space within a housing in which the muffler is housed.

26. The power generator unit of claim 18, wherein the second fan is configured to draw at least a portion of heated air from outside the generator housing and to discharge said portion of external air and said portion of heated air through the discharge opening.

27. A power generator unit comprising:

a housing including at least two air inlet openings and at least one outlet opening;

an engine disposed at least partially within the housing, the engine including a crankcase formed at least in part by a crankcase cover and an output shaft extending through the crankcase cover, the crankcase cover including a recess and at least one opening;

a muffler communicating with the engine through an exhaust conduit;

a generator coupled to the output shaft and driven by the engine, the generator disposed at least partially within the housing, at least a portion of the generator received in the recess of the crankcase cover;

a first fan driven by the engine and disposed on one side of the engine;

a second fan driven by the engine and disposed on the other side of the engine, the second fan configured to draw cooling air through the at least one opening and into the crankcase cover and over at least a portion of the generator;

a battery disposed within the housing immediately next to but spaced apart from one of the air inlet openings;

an electronic control module communicating with at least one of the engine and generator so as to control at least one operational characteristic of the power generator unit, the electronic control module positioned immediately next to, but spaced apart from the other air intake opening, each intake opening communicating with an interior space within the housing in which air that flows through the one air inlet opening and over the battery merges with air that flows through the other air inlet opening and over the electronic control module, the first fan drawing air from the interior space and communicating with a first air path that extends from the first fan, across at least portions of the exhaust conduit and the muffler, to the air outlet opening, and the second fan drawing air from the interior space and communicating with a second air path that passes across the generator and over at least a portion of the muffler before exiting the outlet opening.

28. A power generator unit comprising:

a housing including at least two air inlet openings and at least one outlet opening;

an engine disposed at least partially within the housing, the engine including a crankcase formed at least in part by a crankcase cover and an output shaft extending through the crankcase cover, the crankcase cover including a recess and at least one opening;

muffler communicating with the engine through an exhaust conduit;

a muffler housing that surrounds at least a portion of the muffler;

a generator coupled to the output shaft and driven by the engine, the generator disposed at least partially within the housing, at least a portion of the generator received in the recess of the crankcase cover;

a generator cover that encloses the generator inside the crankcase cover and includes at least one opening;

a first fan driven by the engine and disposed on one side of the engine;

a second fan driven by the engine and disposed on the other side of the engine, the second fan configured to draw cooling air through the at least one opening in the crankcase cover, into the crankcase cover and over at least a portion of the generator, the second fan configured to blow cooling air from the crankcase cover and through the at least one opening in the generator cover into the muffler housing;

a battery disposed within the housing immediately next to but spaced apart from one of the air inlet openings;

an electronic control module communicating with at least one of the engine and generator so as to control at least one operational characteristic of the power generator unit, the electronic control module positioned immediately next to, but spaced apart from the other air intake opening, each intake opening communicating with an interior space within the housing in which air that flows through the one air inlet opening and over the battery merges with air that flows through the other air inlet opening and over the electronic control module, the first fan drawing air from the interior space and communicating with a first air path that extends from the first fan, across at least portions of the exhaust conduit and the muffler, to the air outlet opening, and the second fan drawing air from the interior space and communicating with a second air path that passes across the generator and over at least a portion of the muffler before exiting the outlet opening.

* * * * *

UNITED STATES PATENT AND TRADEMARK OFFICE
CERTIFICATE OF CORRECTION

PATENT NO. : 6,975,042 B2
APPLICATION NO. : 10/630593
DATED : December 13, 2005
INVENTOR(S) : Yamada et al.

It is certified that error appears in the above-identified patent and that said Letters Patent is hereby corrected as shown below:

At page 2, column 2 (Foreign Patent Documents), line 6, please delete "JP 11-36881 2/1999 JP" and insert -- JP 11-36881 2/1999 --, therefor.
      At page 2, column 2 (Foreign Patent Documents), line 7, please delete "2002-54453 2/2002" and insert -- JP 2002-54453 2/2002 --, therefor.
      At column 2, line 66, please delete "illustrates" and insert -- illustrate --, therefor.
      At column 4, line 30, below "current (AC) power." please insert -- An electronic control module 24 (Figure 14) is electrically coupled with the generator 22 to convert the AC power to a high quality AC power. The electronic control module 24 incorporates an electronic control module 24 to control an output of the electronic control module 24. The power generator until 10 also includes a DC/DC converter 27. The DC/DC converter 27 is electrically coupled to the electronic control module 24. --, therefor.
      At column 4, lines 38-44, please delete "The electronic control module 24 controls the output of the generator 22 and the output of the DC/DC converter 27. Preferably, the control module 24 comprises at least a central processing unit (CPU) and some form of memory or storage. The operation of the electronic control module 24, and the DC/DC converter 27 will be explained in greater detail below.", therefor.
      At column 4, line 35, please delete "unit 26" and insert -- unit 24 --, therefor.
      At column 4, line 46, please delete "module 24" and insert -- module 26 --, therefor.
      At column 5, line 45, below "(FIG. 5)." please insert -- In the illustrated embodiment, the fuel tank 29 lies above the general position of the engine 12 to the right of the electronic control module 24 allowing for a large fuel storage capacity. The electronic control module 24 is positioned above the battery 28 and immediately next to but spaced apart from the first set of cooling air intake vents 32. --, therefor.
      At columns 5-6, lines 60-67 of column 5 & lines 1-9 of column 6, please delete "The electronic control module 24 preferably includes cooling fins. In the illustrated embodiment, a generally planar surface of the electronic control module 24 includes the cooling fins. The electronic control module 24 is advantageously fastened through mounts 76 directly behind, but spaced apart from, the first set of cooling air intake vents 32. This direct mounting of the electronic control module 24 immediately next to the air intake vents 32 allows the cooling air to first contact the planar surface of the module 24 providing substantial cooling of the module 24. Mounting of the electronic control module 24 directly behind the first set of cooling air access intake vents 32 also helps insulate the internal noise of the power generator unit 10, thereby providing quieter operation. The power generator unit's operational noise is quieted even though air is allowed to freely enter the cooling intake vents 32 to efficiently cool internal components of the power generator unit 10.", therefor.

UNITED STATES PATENT AND TRADEMARK OFFICE
CERTIFICATE OF CORRECTION

PATENT NO. : 6,975,042 B2
APPLICATION NO. : 10/630593
DATED : December 13, 2005
INVENTOR(S) : Yamada et al.

It is certified that error appears in the above-identified patent and that said Letters Patent is hereby corrected as shown below:

At column 6, line 10, below "unit 10." please insert -- Figures 1 and 2 illustrate various cooling air paths of power generator unit 10. There preferably are at least two generally distinct cooling air paths through the sound insulation cover 36. Each cooling air path preferably is designed to cool components of a similar temperature. For example, a first cooling path A is designed to cool warmer operating components of the power generator unit 10, for example, the engine cylinder 16 and the cylinder head 17. A second cooling air path B is designed to cool those components that normally operate at a lesser temperature, for example the crankcase 14 and the generator 22. The use of two, generally separate cooling air paths allows for improved cooling efficiency. Both cooling paths A and B cool the respective components, converge into the muffler housing 80, and proceed to cool the muffler 31 before exiting the power generator unit 10. --, therefor.

At columns 6-7, lines 54-67 of column 6 & lines 1-11 of column 7, please delete "Air flow along the second cooling air path B also originates from a portion of the cooling air that enters the air intake vents 32 and initially cools the electronic control module 24. The air flow along the second cooling air path B is also comprised of the other portion of the cooling air that enters the second cooling air intake vent 34 that initially cools the battery 28, starter motor 70, and the crankcase 14. A generator cooling fan 86 including at least one blade draws air into the crankcase cover 74 through various cooling air intake vents 88 (FIG 2). The generator cooling fan 86 is connected to the generator 22 through a fan hub 90. The drawn-in air passes through and cools the generator 22 and is guided by the arrangement of internal components within the crankcase cover 74 to enter the muffler housing 80 to cool the muffler 31 and then to exit through a portion of a side cover effluent air vent or outlet opening 92. These two generally distinct cooling paths A, B are advantageously separated until they merge in muffler housing 80, thereby allowing efficient cooling of the warmer components of the power generator unit 10, as well as cooling of those components operating at a lower temperature within the power generator 10. Incorporated into the effluent vent 92 is an exhaust outlet recess 94 where a tail pipe 96, which is connected to the muffler 31, discharges exhaust gases to the outside environment.", therefor.

At column 8, line 19, please delete "module 24" and insert -- module 26 --, therefor.

At column 8, line 53, below "generator 22." please insert -- Figures 8 and 9 illustrate a rear side view and a top side view respectively of the crankcase cover 74. As understood from the shape of the air deflector 82, the cooling air from the cylinder along cooling path A is deflected outward by the air deflector 82 to inhibit the air that cooled the cylinder 16 from entering the crankcase/generator cover 74 and reaching the generator 22. The air flowing along cooling path A is then further deflected by the exhaust pipe cover 108 into the muffler house 80. --, therefor.

UNITED STATES PATENT AND TRADEMARK OFFICE
CERTIFICATE OF CORRECTION

PATENT NO.        : 6,975,042 B2
APPLICATION NO. : 10/630593
DATED             : December 13, 2005
INVENTOR(S)       : Yamada et al.

It is certified that error appears in the above-identified patent and that said Letters Patent is hereby corrected as shown below:

At column 9, lines 4-20, please delete "With reference to Figure 10, a right side view of the crankcase cover 74 shows the area where the generator 22 is mounted to the crankcase cover 74. A generator mounting area 142 of the crankcase cover 74 preferably incorporates a circular size and shape closely matching the size and shape of the generator 22. This similar size and shape of the generator mounting area 142 allows the cooling air to efficiently cool the generator by generally forcing the cooling air to flow through the generator 22 and to inhibit the cooling air from traveling around the generator 22. The cooling air intake vents 88 also encourage the cooling air to pass through the generator 22 instead of immediately escaping the generator 22 in the opposite direction against the cooling air flow. A plurality of securing boss members permit the crankcase/generator cover 74 to be securely attached to the engine 12 and to allow other covers to be secured.", therefor.

At column 9, line 61, please delete "module 24" and insert -- module 26 --, therefor.

At column 9, line 62, please delete "module 24" and insert -- module 26 --. therefor.

At column 9, line 65, please delete "module 24" and insert -- module 26 --, therefor.

At column 10, line 2, please delete "module 24" and insert -- module 26 --, therefor.

At column 10, line 15. please delete "module 24" and insert -- module 26 --, therefor.

At column 10, line 17, please delete "module 24" and insert --module 26 -- , therefor.

At column 12, line 42 (Approx.), in Claim 21, please delete "fan." And insert -- fin. --, therefor.

At column 14, line 4, in Claim 28, please insert -- a -- before "muffler", therefor.

Signed and Sealed this

Twenty-fourth Day of October, 2006

JON W. DUDAS
*Director of the United States Patent and Trademark Office*